US009933825B2

(12) United States Patent
Hanumaiah et al.

(10) Patent No.: US 9,933,825 B2
(45) Date of Patent: Apr. 3, 2018

(54) DETERMINING PARAMETERS THAT AFFECT PROCESSOR ENERGY EFFICIENCY

(71) Applicant: Arizona Board of Regents for and on behalf of Arizona State University, Scottsdale, AZ (US)

(72) Inventors: Vinay Hanumaiah, Campbell, CA (US); Sarma Vrudhula, Chandler, AZ (US)

(73) Assignee: Arizona Board of Regents for and on behalf of Arizona State University, Scottsdale, AZ (US)

(*) Notice: Subject to any disclaimer, the term of this patent is extended or adjusted under 35 U.S.C. 154(b) by 747 days.

(21) Appl. No.: 14/207,859

(22) Filed: Mar. 13, 2014

(65) Prior Publication Data

US 2014/0281609 A1    Sep. 18, 2014

Related U.S. Application Data

(60) Provisional application No. 61/781,162, filed on Mar. 14, 2013.

(51) Int. Cl.
*G06F 1/26* (2006.01)
*G06F 1/32* (2006.01)
*G06F 1/20* (2006.01)

(52) U.S. Cl.
CPC ............. *G06F 1/206* (2013.01); *G06F 1/324* (2013.01); *G06F 1/3296* (2013.01); *Y02B 60/1217* (2013.01); *Y02B 60/1275* (2013.01); *Y02B 60/1285* (2013.01)

(58) Field of Classification Search
CPC ............ G06F 11/3409; G06F 11/3414; G06F 11/3428; G06F 11/3466; G06F 2201/81; G06F 2201/88; G06F 1/206
See application file for complete search history.

(56) References Cited

U.S. PATENT DOCUMENTS

| 5,422,806 A | 6/1995 | Chen et al. |
|---|---|---|
| 2008/0162388 A1 | 7/2008 | de la Guardia et al. |
| 2009/0204267 A1 | 8/2009 | Sustaeta et al. |
| 2010/0057404 A1* | 3/2010 | Dittmann ............... G06F 1/3203 702/186 |
| 2010/0191936 A1* | 7/2010 | Khatri ................... G06F 1/3203 712/42 |

(Continued)

OTHER PUBLICATIONS

International Search Report and Written Opinion, PCT/US2014/025471, dated Jun. 17, 2014, 14 pages.

(Continued)

*Primary Examiner* — Thomas Lee
*Assistant Examiner* — Zhipeng Wang
(74) *Attorney, Agent, or Firm* — Fish & Richardson P.C.

(57) ABSTRACT

An example process for controlling a processor may include: (i) obtaining parameters associated with operation of a processor, where each of the parameters has a different time scale; (ii) performing an iterative process to identify ones of the parameters that achieve a particular energy efficiency in the processor, where the energy efficiency of the processor corresponds to a quasi-concave function having a maximum that corresponds to the ones of the parameters; and (iii) controlling the processor using the ones of the parameters.

16 Claims, 8 Drawing Sheets

(56) References Cited

U.S. PATENT DOCUMENTS

| | | | | |
|---|---|---|---|---|
| 2010/0194321 A1* | 8/2010 | Artman | | G06F 1/206 |
| | | | | 318/454 |
| 2011/0264938 A1* | 10/2011 | Henroid | | G06F 1/3203 |
| | | | | 713/323 |
| 2014/0215241 A1* | 7/2014 | Yoon | | G06F 1/324 |
| | | | | 713/322 |
| 2014/0237272 A1* | 8/2014 | Sadowski | | G06F 1/3275 |
| | | | | 713/320 |
| 2014/0277815 A1 | 9/2014 | Hanumaiah et al. | | |
| 2015/0106640 A1 | 4/2015 | Brackman et al. | | |

OTHER PUBLICATIONS

Sharifi, Shervin, et al., "Accurate Direct and Indirect On-Chip Temperature Sensing for Efficient Dynamic Thermal Management," IEEE Transactions on Computer-Aided Design of Integrated Circuits and Systems, vol. 29, No. 10, Oct. 2010, pp. 1586-1599.

Wang, Xiaorui, et al., "Adaptive Power Control with Online Model Estimation for Chip Multiprocessors," IEEE Transactions on Parallel and Distributed Systems, vol. 22, No. 10, Oct. 2011, pp. 1681-1696.

Welch, Greg, et al., "An Introduction to the Kalman Filter," University of North Carolina at Chapel Hill, Jul. 24, 2006, 16 pages.

Borkar, Shekhar, "Thousand Core Chips—A Technology Perspective," DAC 2007, Jun. 4-8, 2007, pp. 746-749.

Boyd, Stephen, et al., "Convex Optimization," Cambridge University Press, 2004, 730 pages.

Bartolini, Andrea, et al., "A distributed and self-calibrating model-predictive controller for energy and thermal management of high-performance multicores," Proceedings of Design, Automation Test in Europe Conference, Mar. 14-18, 2011.

Chantem, Thidapat, et al., "Online Work Maximization under a Peak Temperature Constraint," in Proc. ISLPED, 2009, pp. 105-110.

Chantem, Thidapat, et al., "Temperature-Aware Scheduling and Assignment for Hard Real-Time Applications on MPSoCs," in Proc. Date, 2008, pp. 288-293.

Cochran, Ryan, et al., "Pack & Cap: Adaptive DVFS and Thread Packing Under Power Caps," MICRO'11, Dec. 3-7, 2011, 11 pages.

Cohen, Aviad, et al., "On Estimating Optimal Performance of CPU Dynamic Thermal Management," IEEE Computer Architecture Letters, Jan.-Dec. 2003, vol. 2, No. 1, pp. 6.

Coskun, Ayse K., et al., "Static and Dynamic Temperature-Aware Scheduling for Multiprocessor SoCs," IEEE Transactions on Very Large Scale Integration (VLSI) Systems, vol. 16, No. 9, Sep. 2008, pp. 1127-1140.

Dhiman, Gaurav, et al., "Dynamic voltage frequency scaling for multi-tasking systems using online learning," ISLPED '07 Proceedings of the 2007 international symposium on Low power electronics and design, pp. 207-212.

Esmaeilzadeh, Hadi, et al., "Dark Silicon and the End of Multicore Scaling," Proceedings of the 38th International Symposium on Computer Architecture (ISCA '11), Jun. 4-8, 2011, 12 pages.

Fu, Yong, et al., "Feedback Thermal Control for Real-time Systems," IEEE Real-Time and Embedded Technology and Applications Symposium (RTAS'10), Apr. 2010.

Ghasemazar, Mohammed, et al., "Minimizing the Power Consumption of a Chip Multiprocessor under an Average Throughput Constraint," 10th Intl. Symposium on Quality Electronic Design, 2010, pp. 362-371.

Guthaus, Matthew R., et al., "MiBench: A free, commercially representative embedded benchmark suite," in Proc. WWC, 2001, pp. 3-14.

Hanumaiah, Vinay, et al., "Performance Optimal Online DVFS and Task Migration Techniques for Thermally Constrained Multi-core Processors," IEEE Transactions on Computer-Aided Design, vol. 30, No. 11, Nov. 2011, pp. 1677-1690.

Hanumaiah, Vinay, et al., "Reliability-aware Thermal Management for Hard Real-time Applications on Multi-core Processors," in Proc. Date, 2011, pp. 184-189.

Hanumaiah, Vinay, et al., "The MAGMA Thermal Simulator," online, http://vrudhula.lab.asu.edu/magma/index.php/Main_Page, last modified Apr. 24, 2011, 3 pages.

Hanumaiah, Vinay, et al., "Throughput Optimal Task Allocation under Thermal Constraints for Multi-core Processors," DAC'09, Jul. 26-31, 2009, pp. 776-781.

"HP Research Smart Cooling," online http://www.hpl.hp.com/research/smart_cooling/, Hewlett-Packard Development Company, 2009, accessed Mar. 7, 2014, 2 pages.

Huang, Wei, et al., "An Improved Block-Based Thermal Model in HotSpot 4.0 with Granularity Considerations," Proc. WDDD, 2007, pp. 1-14.

Huang, Wei, et al., "HotSpot: A Compact Thermal Modeling Methodology for Early-Stage VLSI Design," IEEE Transactions on Very Large Scale Integration (VLSI) Systems, vol. 14, No. 5, May 2006, pp. 501-513.

Intel, "Advanced Configuration and Power Interface Specification," http://www.acpi.info/spec.htm, Nov. 13, 2013.

Intel R® 64 and IA-32 Architectures Software Developer's Manual, Intel Corporation, Aug. 2012, http://www.intel.com/content/www/us/en/processors/architectures-software-developer-manuals.html. [accessible online—no copy attached].

Isci, C., et al., "Live, Runtime Phase Monitoring and Prediction on Real Systems with Application to Dynamic Power Management," Proc. Intl' Symposium Microarch. (MICRO), 2006, 12 pages.

Jayaseelan, Ramkumar, et al., "Temperature aware Task Sequencing and Voltage Scaling," in Proc. ICCAD, 2008, pp. 618-623.

Jung, Hwisung, et al., "Stochastic Dynamic Thermal Management: A Markovian Decision-based Approach," Proceedings of ICCD, 2006, pp. 452-457.

Kalman, R.E., "A New Approach to Linear Filtering and Prediction Problems," Transactions of the ASME-Journal of Basic Engineering, 82 (Series D): 35-45, 1960, 12 pages.

Laudon, James, "Performance/Watt: The New Server Focus," ACM SIGARCH Computer Architecture News—Special issue, vol. 33, Issue 4, Nov. 2005, pp. 5-13.

Liang, Wen-Yew, et al., "An Energy Conservation DVFS Algorithm for the Android Operating System," Journal of Convergence, vol. 1, No. 1, Dec. 2010, pp. 93-100.

Liao, Weiping, et al., "Temperature and Supply Voltage Aware Performance and Power Modeling at Microarchitecture Level," IEEE Transactions on Computer-Aided Design of Integrated Circuits and Systems, vol. 24, No. 7, Jul. 2005, pp. 1042-1053.

Mulas, Fabrizio, et al., "Thermal Balancing Policy for Streaming Computing on Multiprocessor Architectures," Date 2008, pp. 734-739.

Munkres, James, "Algorithms for the Assignment and Transportation Problems," Journal of the Society for Industrial and Applied Mathematics, Mar. 1957, vol. 5, No. 1, pp. 32-38.

Murali, Srinivasan, et al., "Temperature-Aware Processor Frequency Assignment for MPSoCs Using Convex Optimization," CODES+ISSS'07, Sep. 30-Oct. 3, 2007, pp. 111-116.

Pallipadi, Venkatesh, et al., "The ondemand Governor: Past, Present, and Future," Proceedings of Linux Symposium, 2006, pp. 215-230.

Papadimitriou, Christos H., et al., "Combinatorial Optimization: Algorithms and Complexity," Dover Publications, 1998.

Powell, Michael D., et al., "Heat-and-Run: Leveraging SMT and CMP to Manage Power Density Through the Operating System," 11th International Conference on Architectural Support for Programming Languages and Operating Systems (ASPLOS 2004), pp. 260-270.

Rao, Ravishankar, et al., "Efficient online computation of core speeds to maximize the throughput of thermally constrained multi-core processors," Proc. ICCAD, 2008, pp. 537-542.

Rao, Ravishankar, "Fast and Accurate Prediction of the Steady-State Throughput of Multicore Processors Under Thermal Constraints," Computer-Aided Design of Integrated Circuits and Systems, IEEE Transactions, Oct. 2009, vol. 28, Issue 10, pp. 1559-1572.

(56) References Cited

OTHER PUBLICATIONS

Rao, Ravishankar, "Fast and Accurate Techniques for Early Design Space Exploration and Dynamic Thermal Management of Multi-Core Processors," Ph.D. Dissertation, Arizona State University, 2008.
Rao, Ravishankar, et al., "Performance Optimal Processor Throttling Under Thermal Constraints," in Proc. CASES, 2007, pp. 257-266.
Rotem, Efraim, et al., "Power-Management Architecture of the Intel Microarchitecture Code-Named Sandy Bridge," IEEE Micro., vol. 32, No. 2, Mar./Apr. 2012, pp. 20-27.
Shin, Donghwa, et al., "Energy-Optimal Dynamic Thermal Management: Computation and Cooling Power Co-Optimization," IEEE Transactions on Industrial Informatics, vol. 6, No. 3, Aug. 2010 pp. 340-351.
"Single-chip Cloud Computer," online http://www.intel.com/content/www/us/en/research/intel-labs-single-chip-cloud-overview-paper.html?wapkw=single-chip+cloud+computer#channel=f23085342953ff&origin=http%3A%2F%2Fwww.intel.com copyright 2009, accessed on Mar. 7, 2014, 2 pages.
Skadron, Kevin, et. al, "Control-Theoretic Techniques and Thermal-RC Modeling for Accurate and Localized Dynamic Thermal Management," Proc. HPCA, 2002, pp. 17-28.
Snowdon, David C., et al., "Koala: A Platform for OS-level power management," Proceedings of the 4th ACM European conference on Computer systems, Jan. 1, 2009, pp. 289-302.
SPEC2006, "The SPEC benchmark," http://www.spec.org/cpu2006/, Sep. 7, 2011, 2 pages.
Srinivasan, Viji, et al., "Optimizing Pipelines for Power and Performance," in Proc. MICRO, 2002, pp. 333-344.
Wang, Yefu, et al., "Temperature-Constrained Power Control for Chip Mutliprocessors with Online Model Estimation," ISCA '09, Jun. 20-24, 2009, 11 pages.
Zanini, Francesco, et al., "Multicore Thermal Management with Model Predictive Control," European Conference on Circuit Theory and Design, 2009, pp. 711-714.
Zhang, Sushu, et al., "Thermal aware task sequencing on embedded processors," DAC'10, Jun. 13-18, 2010, pp. 585-590.
Intel R® 64 and IA-32 Architectures Software Developer's Manual, Intel Corporation, Aug. 2012.
R. Cochran, S. Reda, "Thermal Prediction and Adaptive Control Through Workload Phase Detection," ACM Transactions on Design Automation of Electronic Systems, vol. 18, No. 1, Article 7, Pub. date: Dec. 2012, 19 pages.

\* cited by examiner

DETERMINING PARAMETERS THAT AFFECT PROCESSOR ENERGY EFFICIENCY

CROSS-REFERENCE TO RELATED APPLICATION

This disclosure claims priority to U.S. Provisional Application No. 61/781,162, which was filed on Mar. 14, 2013. U.S. Provisional Application No. 61/781,162 is incorporated by reference into this disclosure.

STATEMENT REGARDING FEDERALLY SPONSORED RESEARCH OR DEVELOPMENT

The invention made with government support under Contract or Grant No. CRS-EHS-509540 awarded by the National Science Foundation (NSF). The government has certain rights in the invention.

TECHNICAL FIELD

This disclosure relates generally to determining values of parameters that affect processor energy efficiency.

BACKGROUND

A microprocessor (or simply "processor") may include one core or multiple cores. A processor having multiple cores is generally called a multi-core processor. A core is typically defined as a central processing unit (CPU) that is capable of receiving and executing instructions independently. In a multi-core processor, multiple cores may cooperate to execute a computer program or programs, e.g., to execute various "threads" of the computer program.

Multi-core processors may include tens or hundreds of cores on a single die. Because of the increased processing abilities afforded by multiple cores, multi-core processors have become the standard for computing in various market segments, such as smartphones, laptops, desktop personal computers (PCs), and servers in datacenters. Among the issues facing processor manufacturers today is the ability to control the operation of individual cores so as to improve some measure of quality of service.

SUMMARY

An example process for controlling a processor may include: (i) obtaining parameters associated with operation of a processor, where each of the parameters has a different time scale; (ii) performing an iterative process to identify ones of the parameters that achieve a particular energy efficiency in the processor, where the energy efficiency of the processor corresponds to a quasi-concave function having a maximum that corresponds to the ones of the parameters; and (iii) controlling the processor using the ones of the parameters. The example process may include one or more of the following features, either alone or in combination.

The parameters may include, but are not limited to, a first parameter the is changeable on a first timescale, a second parameter that is changeable on a second timescale, and a third parameter that is changeable on a third timescale, where the first timescale is greater than the second timescale, and the second timescale is greater than the third timescale. The first parameter may include a fan speed corresponding to a speed of a fan used to cool the processor, the second parameter may include task allocation corresponding to an allocation of tasks to a core of the processor, and the third parameter may include a combination of voltage and processor speed, where the voltage corresponds to a voltage applied to the core of the processor and the speed corresponds to a frequency of the core of the processor.

The iterative process may include determining energy efficiency values for the processor for different values of at least one of voltage or processor speed while the fan speed and task allocation are constant. The iterative process may include determining energy efficiency values for the processor for different task allocations while, for each of the different task allocations, the fan speed is constant and at least one of voltage or processor speed varies. The iterative process may include determining energy efficiency values for different fan speeds while, for each of the different fan speeds, both the task allocation and at least one of voltage or processor speed varies. The iterative process may include determining energy efficiency values for the processor for different values of at least one of voltage or processor speed while task allocation and fan speed are held constant; determining energy efficiency values for the processor for different task allocations while fan speed is held constant; and determining energy efficiency values for the processor for different fan speeds.

The processor may be a multi-core processor and at least some of the parameters are for different cores of the multi-core processor.

Energy efficiency may be expressed in terms of performance-per-watt (PPW) for the processor. The PPW for the processor may be modeled by an objective function that relates PPW to processor speed (which may be related to core voltage), task migration, total power, and fan power consumption, where the fan power consumption is a function of fan speed. The iterative process may be performed to optimize the objective function to obtain a maximum PPW for the processor. The ones of the parameters being may be used to obtain the maximum PPW during operation of the processor.

Controlling the processor may include selecting a value of a scalable parameter, and applying the scalable parameter to the ones of the parameters to emphasize a type of operation of the processor.

The systems and techniques described herein, or portions thereof, can be implemented as a computer program product that includes instructions that are stored on one or more non-transitory machine-readable storage media, and that are executable on one or more processing devices to control (e.g., to coordinate) the operations described herein. The systems and techniques described herein, or portions thereof, can be implemented as an apparatus, method, or electronic system that can include one or more processing devices and memory to store executable instructions to implement various operations.

The details of one or more implementations are set forth in the accompanying drawings and the description below. Other features and advantages will be apparent from the description and drawings, and from the claims.

DETAILED DESCRIPTION

Typical computing systems attempt to improve performance under various operating constraints. Improved performance can result in increased energy expenditures, or costs, by the system. An energy expenditure may include energy for performing computations and also costs associated with cooling the system. Performance-per-watt (PPW) is one metric used to measure energy expenditure. Generally, PPW is equal to the number of instructions that are executed by a processor (referred to as "throughput") per Joule of energy.

Described herein are example processes for determining parameters used to achieve a desired PPW in a processor, such as a heterogeneous multi-core processor. The example processes described herein are not limited to use with a heterogeneous, multi-core processor, but rather are usable on any appropriate type of single-core or multi-core processor. In some implementations, the example processes use dynamic frequency and voltage scaling, task (or thread) migration, and active cooling to control the processor cores to vary (e.g., to increase) the processor's PPW. Generally, task migration is a change to an allocation of tasks among processor cores. In some example implementations, the processes may be used to improve or even to maximize the PPW of a given processor for a given set of operating conditions or constraints.

The example processes may be implemented by a computing device, such as a closed-loop controller, in communication with the processor or by one or more cores of the processor itself, in the case of a multi-core processor. In some implementations, a closed loop controller may implemented on the processor itself. The example processes may include determining the following parameters to affect (e.g., maximize) the processor's PPW: parameters relating to the processor's cooling system, such as the speed of the fan used to cool the processor (the "fan speed"), parameters relating to an assignment of tasks to cores of the processor (the "task allocations"), and parameters relating to transient voltages and speeds used in the processor cores. These parameters may be used to determine a solution to an objective function that defines the processor's PPW. In this example, an objective function includes a mathematical relationship that may be solved given certain constraints and variables. Processes to solve an objective function for purposes such as those described herein are referred to generally as dynamic thermal management (DTM).

Figure 1:
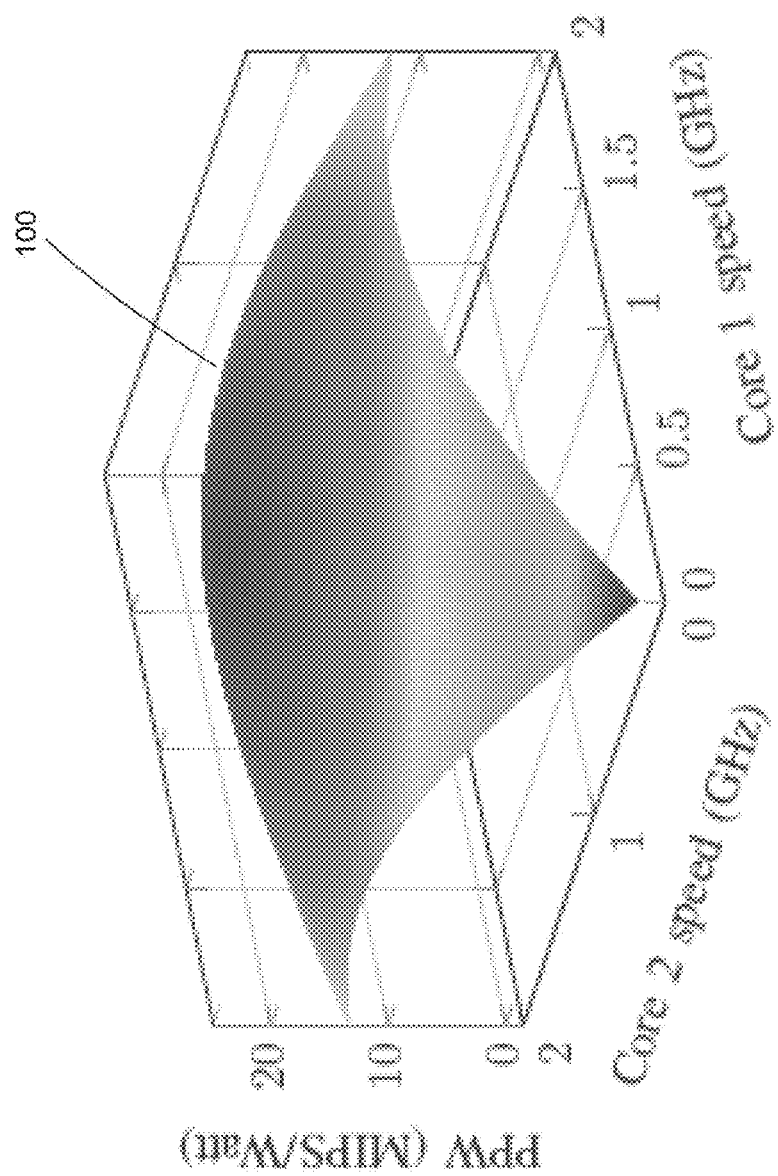
FIG. 1 is an example graph showing the quasi-concave nature of the performance-per-watt (PPW) metric.

In the examples implementations described herein, the PPW is a quasi-concave (unimodal) function of processor core and of fan speeds. An example of a quasi-concave function 100 is shown in FIG. 1. As shown in FIG. 1, due to its generally concave shape, quasi-concave function 100 has a single maximum. In the example implementations described herein, fan speed ($s_{fan}$) of the processor, task allocations (M) for the processor, and voltage (v) and speed (s) of the processor may be used to determine a value of the quasi-concave function. The parameters that determine the value may be the parameters that provide the most energy efficient operation of the processor.

In other implementations, however, parameters other than those described above, or different combinations of those parameters may be used to determine a PPW for the processor. As noted below, some processors may use cooling mechanisms other than fans. In those examples, the fan speed may be replaced with appropriate parameter(s) for such cooling systems.

In some implementations, the operations performed to determine the solution to the quasi-concave function may include performing a binary search. The binary search may include iterating through multiple different fan speeds, task allocations, and processor voltages and corresponding speeds and, for each iteration, performing a mathematical operation to identify the fan speed, the task allocations, and the processor voltage/speed that provides the best PPW. Processor speed and voltage are changeable on similar timescales and may be varied at the same interval in the processes described herein. In some implementations, the operations performed to determine a solution to the quasi-concave function include iterating through different combinations of fan speed, task allocation, and processor voltage/speed until a combination of these variables is found that provides an acceptable (or the best) PPW.

The PPW metric may also be used as part of a performance$^\alpha$/Watt ($P^\alpha$PW) metric to emphasize or deemphasize certain types of operation. The relative importance of performance and energy in a processor may be controlled by setting a value of $\alpha$. In some implementations, setting the scalable parameter, $\alpha$, to be greater than one results in greater weight assigned to processor performance. Setting $\alpha$ between a value of zero and one emphasizes the importance of energy reduction over performance. The $\alpha$ metric is useful in scenarios where certain operations demand higher performance, while other applications can be slowed-down to, e.g., lower energy consumption. For instance, in a smartphone, operations such as channel estimation, demodulation, and audio and video modulation-demodulation many be a high priority and demand higher performance, whereas applications such as web browsers, electronic mail (e-mail) clients, rasterization, and pixel blending can afford a slower execution and can thus contribute towards energy savings. By varying $\alpha$, it is possible to express, mathematically, the relationship between processor performance and PPW, and to set that metric within the processor itself so as to control its performance. For example, $\alpha$ may be applied to (e.g., multiplied by or otherwise factored into equations defining) fan speed, task allocation, and processor voltage/speed (or other) parameters to achieve a desired emphasis on performance or energy consumption.

Figure 2:
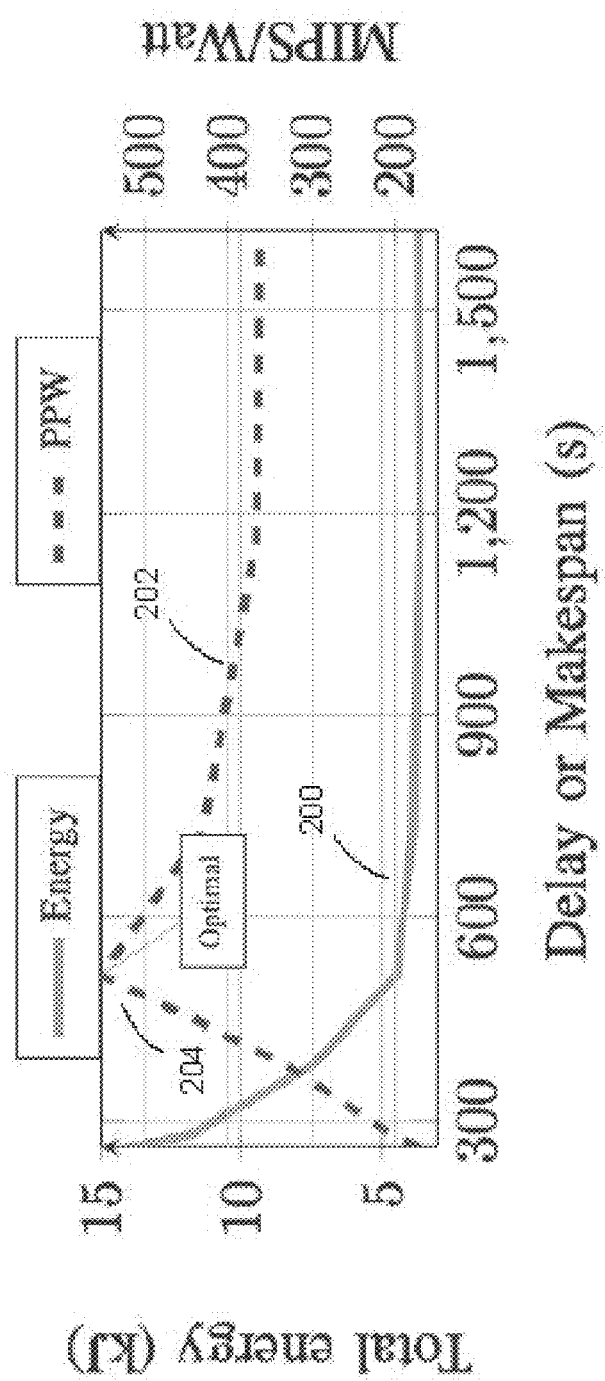
FIG. 2 is a graph showing an example energy-delay curve describing the performance of a processor.

In this regard, in general, performance and energy consumption are opposing metrics: improving one is often achieved at the expense of the other. FIG. 2 shows the results of simulating the execution of a set of benchmark programs on a processor, and of monitoring the total energy consumed and the latest completion time of the tasks (makespan), while varying the processor's clock frequency. FIG. 2 shows that as the delay (makespan) increases, the energy consumption 200 decreases monotonically, whereas the ratio of throughput to energy (PPW) 202 has a unique maximum value 204.

As noted, control variables used in an example processes may include: (1) the supply voltage (v) and clock frequency/speed (s) of each processor core, (2) the allocation of tasks or threads (M) to various processor cores, and (3) the processor fan speed ($s_{fan}$). Also taken into account by the processes described herein is the relationship between a core's speed, voltage, and temperature, which arises due to the mobility degradation of transistors at higher temperatures.

Figure 3:
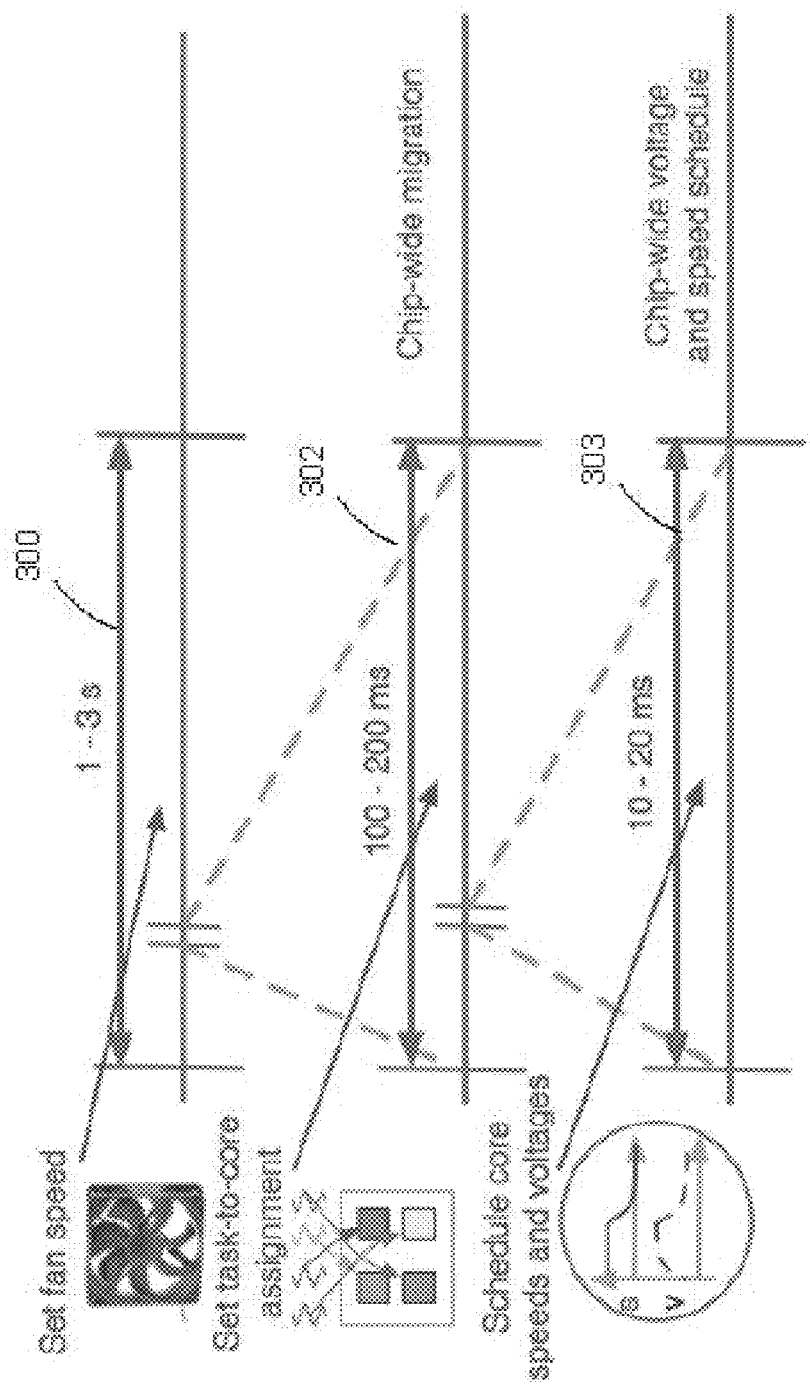
FIG. 3 includes graphs showing example timescales of optimization related to the performance of a processor.

The three different control parameters, namely, the fan speed, the task allocation, and the voltage/speed of each core operate on different time scales, as shown in FIG. 3. Referring to FIG. 3, in an example, the fan is relatively slow, and its speed 300 can be changed every 1 to 3 seconds. Referring to FIG. 3, in an example, the chip-wide migration interval 302 for allocating tasks to cores is between 100 ms to 200 ms. Referring to FIG. 3, in an example, the core speed and voltage can be changed 303 every 10 ms to 20 ms, which is the order of the die thermal time constant ($\tau_{die}$). In some examples, changes to core speed result in corresponding voltage changes. As described in more detail below, after a control parameter (voltage and speed, task migration, or fan speed) is changed, it is held constant during its interval, e.g., the task allocation happens only at the beginning of a migration interval 302, and the voltage/speeds of cores are changed within that migration interval, but only at the start of a dynamic voltage and frequency scaling (DVFS) scheduling interval. The parameters are changed during operation of a processor, as described below, in order to identify which set of parameters provides a desired (e.g., maximum) PPW.

An example implementation of the processes is performed using a multi-core processor having timing characteristics, such as those described above with respect to FIG. 3, and that includes n (n≥1) cores, each of which is configured to execute a single task/thread absent inter-task communication. In this example, the cores need not be homogeneous or have identical workloads, and the cores are capable of operating at independent speeds and voltages. In this example, the core speeds (s) and voltages (v) are continuous and normalized over [0,1], and the cores' tasks have non-identical power characteristics. In this example, the performance or the throughput of the processor is measured by the weighted sum of speeds of cores. The weights (w) can be the instructions per cycle (IPC) or the priorities of tasks.

The following explains equations that model the foregoing example processor and its operation. Thereafter, processes are explained for identifying parameters to provide a desired (e.g., maximum) PPW.

The thermal behavior of a multi-core processor may be estimated for a given power dissipation using any appropriate processes. For example, the processor may be divided into number of layers and each layer may be further divided into thermal blocks. In an example implementation, m is the number of functional blocks in each core. Corresponding to each such block is a thermal block in a corresponding thermal interface layer (TIM). In this example, there are five heat spreader thermal blocks and nine heat sink thermal blocks. A heat spreader block spreads heat to other blocks, whereas a sink block sinks heat from other blocks. Thus, the total number of thermal blocks is N=2 nm+14.

In this example implementation, P and T denote N×1 power and temperature vectors, with each entry of each vector corresponding to a thermal block. An example of the positions of the thermal blocks in the P and T vectors for a four-core processor with m=20 blocks in each core is shown below:

$$P \text{ or } T = \begin{bmatrix} \text{Die: Core 1 (1 – 20)} \\ \vdots \\ \text{Die: Core 4 (61 – 80)} \\ \hline \text{TIM: Core 1 (81 – 100)} \\ \vdots \\ \text{TIM: Core 4 (141 – 160)} \\ \hline \text{Spreader (161 – 165)} \\ \hline \text{Package (166 – 174)} \end{bmatrix}$$

The P and T vectors include positions for each die core and each TIM core.

In this example, the total power of a processor, P(s,v,T,t), is defined as the sum of the processor's dynamic power $P_{dyn}$(s,v,t) and the processor's leakage power $P_{lkg}$(v,T,t). Total power is thus a function of the core speed (s), core voltage (v), the Temperature vector (T), and the time (t). The leakage (lkg) power of a core generally depends on the core voltage and temperature, and a thermal model relates the temperature of a core to its total power, which includes the leakage power. The leakage power results from current leaking through transistors even when those transistors are turned-off, resulting in power dissipation. The dynamic (dyn) power consumption of a core is a time-varying function of core speed, voltage, and task allocation. Generally, dynamic power consumption results from repeated capacitance charge and discharge on the outputs of gates of transistors used in a processor.

In this example, T is determined using the following state-space equation:

$$\frac{dT(t)}{dt} = -C^{-1}GT(t) + C^{-1}P(s, v, T, t). \quad (1)$$

In equation (1), G and C are conductance and capacitance (diagonal) matrices, respectively, which have dimensions of N×N. Elements of the conductance matrix represent heat spreading between a pair of nodes, and elements of the capacitance matrix elements represent heat storage capacity of an individual node. The nodes correspond to cores of the example multi-core processor. Through the substitutions of equation (2) below, an equation that may be used to model T is equation (3) below:

$$B = C^{-1}, A = -BG \quad (2)$$

$$\frac{dT(t)}{dt} = AT(t) + BP(s, v, T, t). \quad (3)$$

Equation (3) reflects a cyclical dependency between power dissipation and temperature determination. This is due to the dependence of leakage power on processor temperature (LDT). A piece-wise linear approximation may be used to decouple leakage power and temperature. The result is as represented in equation (4) as follows:

$$P_{lkg}(T, v, t) = P_{lkg,0}(T, v, t) + P_{lkg,T}(T, v, t)T(t) + P_{lkg,v}(T, v, t)v(t) \quad (4)$$

In equation (4), $P_{lkg,0}$(N×1) is the leakage power (lkg) offset at a given processor voltage and temperature. $P_{lkg,T}$ and $P_{lkg,v}$ are diagonal matrices of size N×N, in which each diagonal element is the partial derivative of the leakage power at the given voltage (v) and temperature (T) with respect to temperature and voltage, respectively.

Using equation (4), the cyclical relationship of power and temperature in equation (3) may be decoupled. Thus, equation (3) can be replaced with the following equation.

$$\frac{dT(t)}{dt} = \hat{A}(T, v, t)T(t) + B\hat{P}(s, v, t) \quad (5)$$

where $$\hat{A}(T, v, t) = A + BP_{lkg,T}(T, v, t), \quad (6)$$

$$\hat{P}(s, v, t) = P_{dyn}(s, v, t) + P_{lkg,0}(T, v, t) + P_{lkg,v}(T, v, t)v(t) \quad (7)$$

$$P(s, v, T, t) = \hat{P}(s, v, t) + P_{lkg,T}(T, v, t)T(t). \quad (8)$$

It is known that higher temperatures cause mobility degradation, which can increase operational delays in a processor. However, higher temperatures can be compensated by increasing a supply voltage. The following equation shows the relation between maximum speed (frequency) (s), voltage (v), and temperature (T) of a circuit.

$$s_c^{max} = k_c^s \frac{(v_c(t) - v_{th})^{1.2}}{v_c(t)\max(T_c(t))^{1.19}}. \quad (9)$$

where $s_c^{max}$ is the maximum operational frequency of a core c of a processor. $T_C$ is a vector of temperatures of thermal blocks in core c; $v_{th}$ is the threshold voltage; and $k_c^s$ is a constant of proportionality. In this example, the constants of proportionality are 1.19 and 1.2, and are estimated values for 65 nm processor technology. However, in other implementations, particularly those for different technologies, the constants may be different.

Active cooling/forced convection cooling can aid in removing heat from a processor. Commonly-used active cooling/forced convection cooling methods include air cooling and liquid cooling. Although air cooling is modeled in the examples using fan speed, there are similar relationships for liquid cooling. Accordingly, the processes described herein are applicable to both air-cooled and liquid-cooled processes. The example processes are also applicable to processers that are cooled via a combination of liquid and air cooling.

In air cooling, a fan blows air at a certain speed over a heat sink or an extended piece of metal connected to the heat sink. Factors that affect the rate of heat removal include the fan speed and the temperature difference between the heat sink and ambient air. An empirical equation relating convection (cooling) resistance $R_{conv}$ to fan speed $s_{fan}$ is:

$$R_{conv}(s_{fan}) = \left(h_1 s_{fan}\left(1 - \exp\left(-\frac{h_2 s_{fan}^{h_3} + h_4}{h_1 s_{fan}}\right)\right)\right)^{-1}. \quad (10)$$

where $h_1$, $h_2$, $h_3$, and $h_4$ are empirical constants that vary depending on characteristics of the fan.

Since the cooling caused by the fan is in addition to normal heat dissipation by the heat sink, the cooling resistance $R_{conv}$ occurs in parallel with processor package thermal resistance. Accordingly, the thermal conductance matrix $G_{pkg}$ for the example processor may be represented as:

$$G_{pkg}(s_{fan}) = G_{pkg} + R_{conv}^{-1}(s_{fan}). \quad (11)$$

Thus, $s_{fan}$ changes the rate of heat dissipation by altering the package thermal resistance. Since $G_{pkg}$ is part of the general conductance matrix G, and since $s_{fan}$ affects the temperatures of all thermal blocks, the following relationship, in which A and G are a function of fan speed, $s_{fan}$, is obtained from equation (2):

$$A(s_{fan}) = -BG(s_{fan}). \quad (12)$$

Power consumption of the fan ($P_{fan}$) as a function of the fan speed ($s_{fan}$) is defined as:

$$P_{fan}(s_{fan}) = k^f s_{fan}^3 \quad (13)$$

where $k^f$ is a predefined constant for the fan.

The remainder of this disclosure also employs the variables defined below in Table 1, some of which were used above.

TABLE 1

| Symbol | Meaning |
|---|---|
| n | Number of cores of a multi-core processor |
| q | Number of tasks assigned to a core or processor |
| m | Number of functional blocks or units in a core |
| N | Total number of thermal blocks in a processor |
| $s_c$ | The normalized clock speed (s) of a core (c) |
| $v_c$ | The normalized voltage (v) of a core (c) |
| $v_{th}$ | The threshold voltage of a circuit, such as a processor |
| $s_{fan}$ | Fan speed, e.g., the normalized angular velocity of the fan |
| $P_{c,b}$ | Total power consumption (P) of a block (b) in a core (c) |
| $P_{dyn,c,b}$ | The dynamic (dyn) power (P) of a block (b) in a core (c) |
| $P_{lkg,c,b}$ | The leakage (lkg) power (P) consumption of block (b) in a core (c) |
| $T_{c,b}$ | The temperature (T) in a block (b) of a core (c) |
| $T^{max}$ | A maximum (max) allowed temperature (T) |
| G | The conductance matrix of an entire processor |
| $P_{lkg,T}$ | The temperature (T) coefficient of leakage (lkg) power (P) in a block (b) of a core (c) |
| $P_{lkg,v}$ | The leakage (lkg) power (P) caused by voltage (v) |
| M | The task-to-core allocation matrix |
| $G_{die,c}$ | The conductance matrix (G) of the die layer (die) of a core (c) |
| $G_{tim,c}$ | The conductance matrix (G) of the TIM layer (TIM) of a core (c) |
| $G_{pkg}$ | The processor package conductance matrix |
| $T_{spr}$ | The temperature of the heat spreader center |

In an example implementation, a multi-core processor performs q tasks, which are not necessarily identical tasks. In this example implementation, the fan speed, task allocations, and core transient voltages and speeds are determined so that the PPW of the processor is improved (e.g., maximized), subject to the foregoing constraints on maximum temperature $T^{max}$ and the voltage-speed relationship provided in equation (9) above.

M, which is the task allocation matrix, is defined as an n×q matrix that represents the assignment of q tasks to n cores. Values for matrix M are defined as follows:

$$M_{ij} = \begin{cases} 1, & \text{if task } j \text{ is assigned to core } i, \\ 0, & \text{otherwise.} \end{cases}$$

The following constraints ensure that each task in M is mapped to one processor core and that each core is mapped to one task.

$$\sum_{i=1}^{n} M_{ij} \leq 1, \sum_{j=1}^{q} M_{ij} \leq 1, \forall i, j. \quad (14)$$

A vector w, corresponding to task weights, is defined as a q×1 vector. The higher a value of w, the higher priority the corresponding task is. PPW is defined in equation (15) below as the ratio of total processor performance to total processor power where, as elsewhere herein, the parentheticals indicate the variables upon which the corresponding functions (e.g., PPW) depend.

$$PPW(s, v, M, s_{fan}, t) = \frac{s^T(t)Mw}{P^T(s, v, M, T, t) \times 1_{N \times 1} + P_{fan}(s_{fan})}. \quad (15)$$

In equation (15), the numerator, which corresponds to processor performance, includes the sum of core speeds weighted by the weights of tasks allocated to those cores. $P^T(s,v,M,T,t) \times 1_{N \times 1}$ in the denominator is the sum of all elements in P(s,v,M,T,t). The term P(s,v,M,T,t) in equation (15) is same as P(s,v,T,t) in equation (8), except that the dynamic power $P_{dyn}$ is a function of M, which is given by $$P_{dyn}(s,v,M,t) = P_{dyn}^{max}(t) M^T \mathrm{diag}(v(t))^2 s(t) \quad (16)$$

In this example implementation, $P_{dyn}(s,v,M,t)$ is an N×1 vector representing the dynamic power associated with each of the processor's N thermal blocks. The term $M^T \mathrm{diag}(v(t))^2 s(t)$ is a q×1 vector in which the $k^{th}$ element is of the form $s_{c_k} v_{c_k}^2$, where $c_k$ is the core to which task k is assigned according to M. $P_{dyn}^{max}(t)$ is an N×q matrix, in which an entry in row i and column j is a maximum dynamic power that can flow into thermal block i as result of running task j. This maximum dynamic power is determined by profiling the tasks on each core while running at the maximum speed and the maximum voltage (s=1, v=1). Multiplying the $i^{th}$ row of $P_{dyn}^{max}(t)$ with the vector $M^T \mathrm{diag}(v(t))^2 s(t)$ yields the $i^{th}$ element of the vector $P_{dyn}(s,v,M,t)$. This is represented by $$P_{dyn}(i) = [P_{dyn}^{max}(i,1), \ldots, P_{dyn}^{max}(i,q)] \times [s_{c_1} v_{c_1}^2, \ldots, s_{c_q} v_{c_q}^2]^T.$$

In some implementations, a local definition of PPW is favored over a global definition of PPW. This may be because improving (e.g., maximizing) global PPW might result in a non-unique solution, depending on the past history of PPW. The following example clarifies this concept.

In this example, a computer starts at time $t_1$ and runs until time $t_2$. The accumulated performance of the computer is $S_1$ and the corresponding power consumption is $P_1$. Then, the computer again starts at time $t_3$, providing a performance $S_2$ with power consumption of $P_2$ until time $t_4$. At time $t_4$, a PPW determination process is started. In this example, the question is whether the process should consider the energy usage pattern from time $t_1$ until time $t_2$ or just from time $t_3$ or $t_4$. Each of the choices will result in different selections of core speeds for the current time. For example, if the process considers the energy usage from time $t_1$, then the global PPW is $$PPW = \frac{S_1 + s(t)}{P_1 + p(t)},$$

where s(t) and p(t) are the current processor speed and resulting power consumption. On the other hand, if the usage from time t3 is considered, then the global PPW is $$PPW = \frac{S_1 + S_2 + s(t)}{P_1 + P_2 + p(t)}.$$

Thus, there is an ambiguity in the solution of core speeds that will improve (e.g., maximize) the energy-efficiency, depending on how much of the past history is considered. This is also true if the future is considered, e.g., how long the machine will be in operation. The ambiguous nature of the definition may reduce the usefulness of a global definition of PPW in favor of a local definition, which can in a unique solution of core speeds for any chosen time interval.

A mathematical model for determining core speeds (s(t)), voltages (v(t)), and fan speed ($s_{fan}(t)$) to improve (e.g., maximize) the overall PPW is as follows.

$$\max_{\substack{s(t),v(t) \\ M, s_{fan}(t)}} \frac{s^T(t)Mw}{P^T(s, v, M, T, t)1_{N \times 1} + P_{fan}(s_{fan}(t))} \quad (17)$$

In equation (17) above, the numerator represents processor performance; the first term of the denominator ($P^T$) represents total power consumption; and the second term of the denominator ($P_{fan}$) represents power consumption of the fan. $M_w$, as defined elsewhere, represents the weighted task allocation matrix, which affects the solution to equation (17). The solution to equation (17) may be determined using, e.g. the binary search process described below, given the constraints set forth in the following equations (18) to (21).

$$\text{s.t.} \quad \frac{dT(t)}{dt} = \hat{A}(T, v, s_{fan}, t)T(t) + B\hat{P}(s, v, M, T, t), \forall t \quad (18)$$

In equation (18), the rate of change of temperature (dT(t)/dt) is the sum of a first component (Â) that models a reduction in temperature due to the fan speed and a second component (BP̂) that is independent of fan speed, but rather corresponds to power consumption and the speed and voltage of the core and task allocations. Equation (18) is the same as equation (5) with the power consumption of tasks controlled by the allocation matrix M.

$$T(t) \leq T^{max}, T(0) = T_0, \forall t \quad (19)$$

$$s_c(t) \leq k_c^s \frac{(v_c(t) - v_{th})^{1.2}}{v_c(t) \max(T_c(t))^{1.19}}, \forall t, c \quad (20)$$

$$0_{n \times 1} \leq v(t) \leq 1_{n \times 1}, \forall t. \quad (21)$$

Equation (19) describes the maximum temperature constraint and the initial temperature. Equation (20) corresponds to equation (9), and equation (21) defines the voltage range as a function of time.

As noted, voltage/speed control, task migration, and fan speed scaling occur on different time scales due to high migration overhead and the relative slowness of the fan. Accordingly, the determination (e.g., optimization) of PPW for each of these controls is addressed separately, as described below.

Before describing an example process for obtaining a solution to the objective function of equation (17), the objective function is modeled as a function of its parameters.

In this regard, the example of FIG. 1 shows a simulation plot of PPW against the core speeds for a dual-core processor. In this example, processor core voltages were determined using equation (20), but with equality, not inequality. This is because using higher voltage than necessary increases power consumption and not performance, thus degrading PPW. The surface of the resulting function 100 in FIG. 1 is quasi-concave, as indicated above. As also explained above, this quasi-concave function has a single solution, and enables a single solution to the objective function modeled by equation (17), with the constraints of equations (18) to (21).

Figure 4:
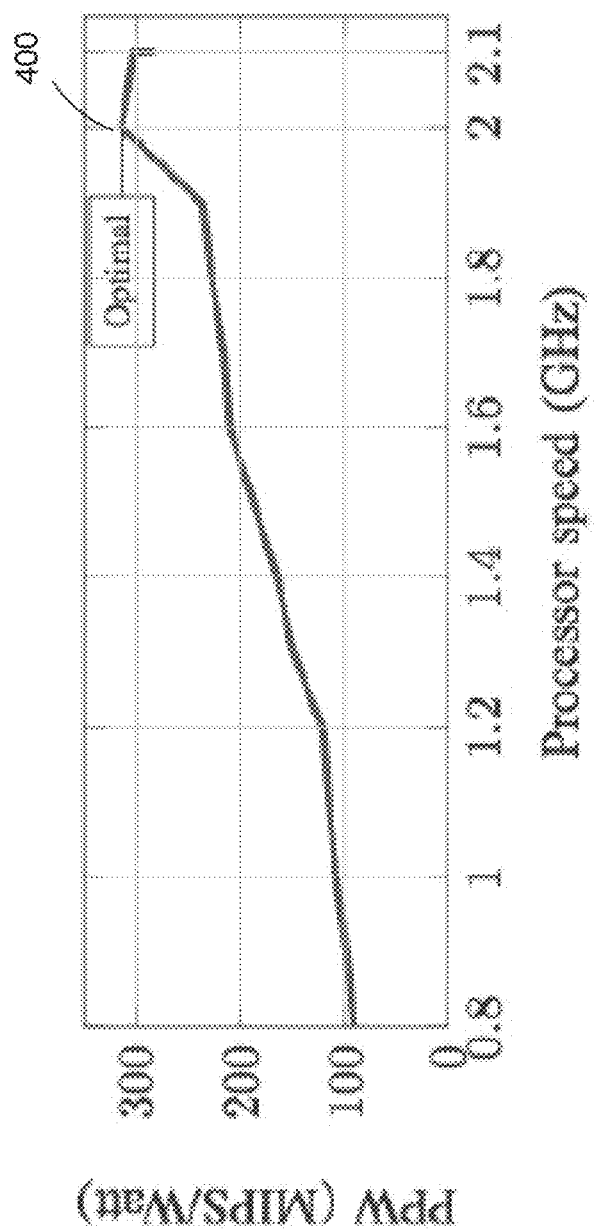
FIG. 4 is a graph showing an example effect of single processor speed on PPW for an example processor.

FIG. 4 illustrates the effect of single processor speed on PPW for an example processor. In the example of FIG. 4, the maximum PPW 400 was achieved at a core speed of 2 GHz. The core speed at which the PPW maximizes varies with the workload and the current temperature.

Figure 5:
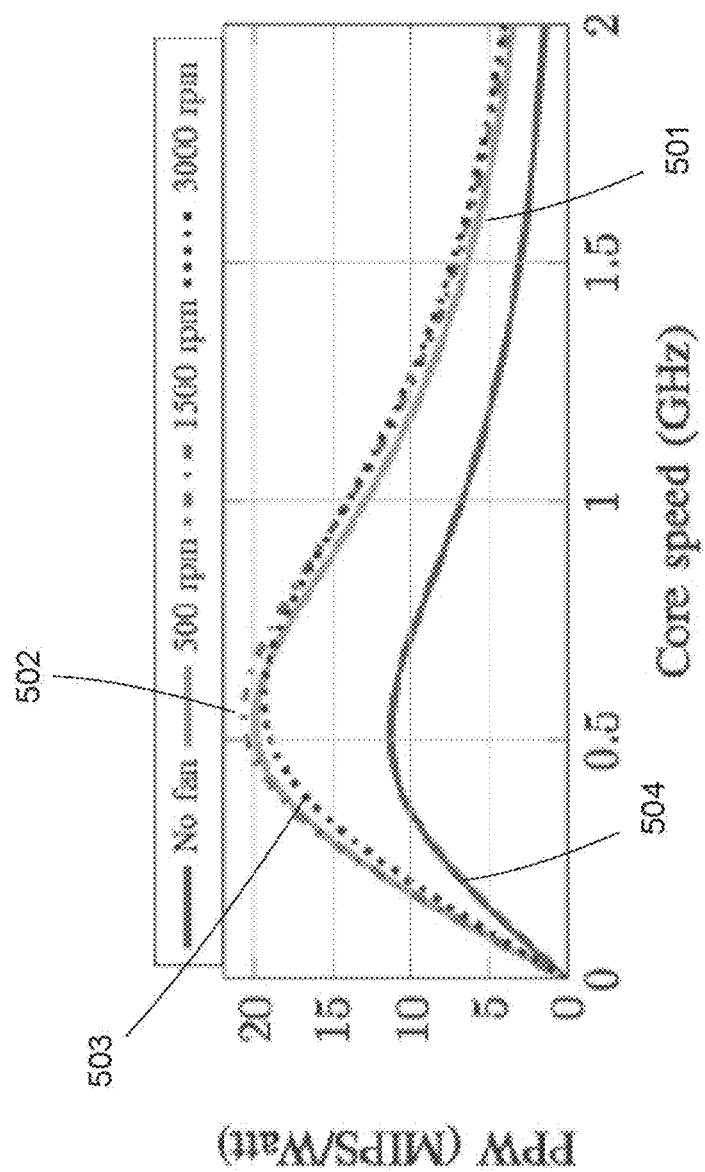
FIG. 5 includes graphs showing example relationships between core speed and fan speed to total power for an example processor.

FIG. 5 illustrates the relationship between the core speed and fan speed to total power for an example processor. The figure shows that the optimal PPW is not only dependent on the core speeds, but also dependent on the fan speed. With different fan speeds 501, 502 and 503 showing different maximum PPWs for the same corresponding core speeds. FIG. 5 also shows the PPW for the case where there is no fan 504.

Shown below is an example process for determining parameters to obtain a desired (e.g., maximum) PPW, and thus a solution to the objective function of equation (17) (with the corresponding constraints). As explained with respect to FIG. 6 and in more detail below, the approach shown below is iterative.

```
Input: P(s,v,T,M,t), T(0), A(s_fan), B, t ∈ [0,t_end]
Output: s(t), v(t), M,s_fan, T(t), t ∈ [0,t_end]
for every t_fan, t_fan ∈ [1 s,3 s] do
|   Find s_fan that maximizes PPW
|   for every t_mig, t_mig ∈ [100 ms, 200 ms] do
|   |   Find M that maximizes PPW
|   |   for every t_dvfs, t_dvfs ∈ [10 ms, 20 ms] do
|   |   |  Find s that maximizes PPW
|   |
|
```

More specifically, the foregoing process receives the above inputs namely P, T, A and B (defined above), for a given multi-core processor, for which PPW plotted against core speeds is a quasi-concave function. The process provides outputs that improve (e.g., maximize) the PPW for the inputs. The outputs, which are defined above include processor core speeds (s(t)), voltages (v(t)), fan speed ($s_{fan}(t)$), task allocation (M), and temperature (T). As explained above, the fan speed changes at a slower rate than the task migration. Task allocation changes at a slower rate (via task migration) than the processor voltage/speed. Accordingly, the process obtains a solution for "faster" parameters (such as s(t) and v(t)) within the time intervals of "slower" parameters, then changes the slower parameters. An example of this process 600 is illustrated in FIG. 6.

Figure 6:
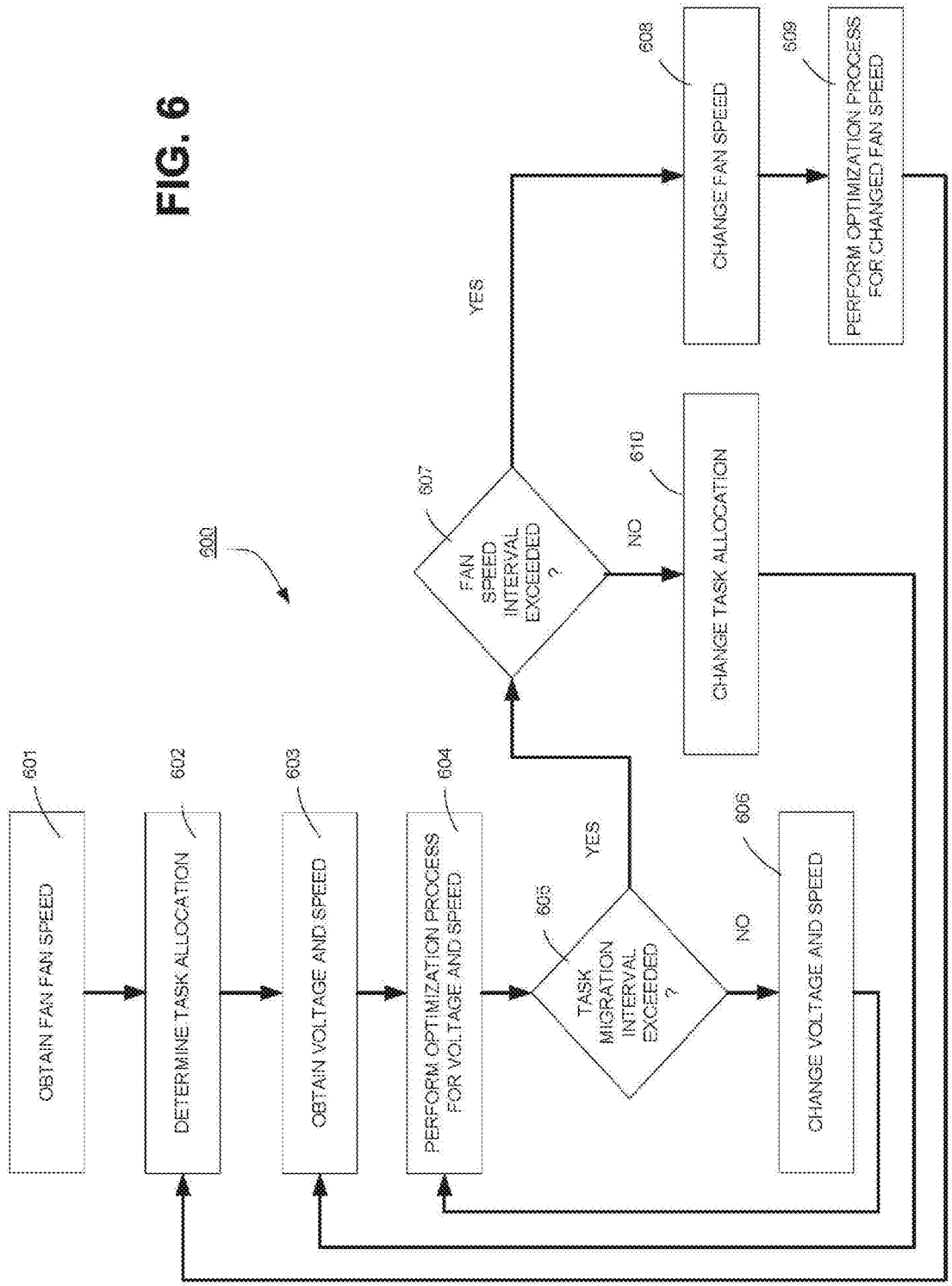
FIG. 6 is a flowchart showing an example process for determining PPW for a processor, such as a multi-core processor.

Referring to FIG. 6, for an example multi-core processor, process 600 obtains (601) a fan speed and corresponding interval, determines (602) a task allocation (resulting from task/thread migration) and corresponding interval, and obtains (603) a voltage/speed setting and corresponding interval. The task allocation may be determined using any appropriate process, such as the "Task-To-Core" allocation process described below.

In each case, the interval corresponds to the speed at which each parameter can be changed. So, in example process 600, the fan speed can be changed at a slower rate than the task allocation, and the task allocation can be changed at a slower rate that the processor voltage/speed. In an example implementation, the fan speed is changeable on the order of seconds, the task allocation is changeable on the order of hundreds of milliseconds (ms), and the voltage/speed are changeable on the order of tens of milliseconds. In other implementations, these values may be different than those set forth here. The intervals for the various parameters correspond to the rates at which the parameters can be changed. So, in this example, the fan speed interval may be one second, the task migration interval may be one hundred milliseconds, and the voltage/speed interval may be ten seconds.

In this example implementation, process 600 performs (604) another process, such as an optimization process, to determine a PPW for the fan speed, task migration, and voltage/speed. An example optimization process is the "Voltage-Speed Control" process described below. Process 600 determines (605) if the time has exceeded the task migration interval. If not (605), the voltage and/or speed are changed (606), while holding the task allocation constant and the fan speed constant. The other process (e.g., the optimization process) is performed (604) for the new voltage/speed settings. This continues until it is determined (605) that the time exceeds the task migration interval. In some implementations, step changes to the voltage/speed at each iteration are such that the entirety of the task migration interval can be covered.

If the time exceeds the task migration interval (605), process 600 determines (607) if the time has exceeded the fan speed interval. If not (607), then process 600 changes (610) the task allocation (e.g., performs task/thread migration), and resets the voltage/speed. The task allocation may be changed using any appropriate process, such as the "Task-To-Core" allocation process described below. Process 600 then iterates through all values of voltage/speed for the changed task allocation, holding that task allocation and fan speed constant. As process 600 progresses, different PPWs are determined for each individual task allocation—one PPW for each combination of voltage/speed with each task allocation. Generally, PPWs are determined for all task allocations within a single fan speed interval (e.g., while the fan speed is held constant).

During execution, at some point process 600 determines (607) that the time exceeds the fan speed interval. At that point, the fan speed is changed (608), and a process, such as an optimization process (609) is performed to determine the PPW for current fan speed and corresponding optimal core speed determined previously in the process. An example optimization process is the "Fan Speed Control" process described below.

Thereafter, task allocations and voltages and speeds are obtained for the new fan speed, and solutions for PPWs are obtained in the manner described above for the new fan speed. In some implementations, process 600 continues until a PPW is obtained for every combination of processor fan speed, identified task allocation, and voltage and current. The best PPW resulting from process 600 corresponds to the maximum of the function 100 shown in FIG. 1, and thus the solution to equation (17). Parameters for this best PPW may be used to operate the multi-core processor. In other implementations, a less than optimum PPW may be desired. In such cases, parameters corresponding to the desired PPW are selected to control the multi-core processor.

Voltage-Speed Control Process

As discussed above, processor voltage/speed control may be performed at every change (scheduling) interval is $t_s \approx \tau_{die}$ (the die thermal time constant). Once determined at the start of a scheduling interval, core voltages and speeds are held constant during that interval. Accordingly, equations (17) to (21) can be discretized for every $t_s$. In this regard, in some processors, core speed and voltage are related such that changing the core speed results in a corresponding and automatic change in core voltage. More specifically, in some processors, changes to the core speed propagate automatically to the core voltage; accordingly, changing speed (s) results in a corresponding core voltage (v) change. For a scheduling interval, the allocation of tasks to cores and the fan speed are fixed (see, e.g., FIG. 3).

The temperature at the end of a $k^{th}$ interval ($kt_s$) can be determined by solving equation (18). This solution may be expressed using a matrix exponential as follows:

$$T(k+1) = e^{\hat{A}(T,v,k)t_s} T(k) + \hat{A}^{-1}(T,v,k)(e^{\hat{A}(T,v,k)t_s} - \mathbb{1}_{N \times N})B\hat{P}(s,v,k).  \quad (22)$$

$$E(T,v,k) = e^{\hat{A}(T,v,k)t_s} \quad (23)$$

$$R(T,v,k) = \hat{A}^{-1}(T,v,k)(e^{\hat{A}(T,v,k)t_s} - \mathbb{1}_{N \times N})B. \quad (24)$$

$\mathbb{1}_{N \times N}$ is an identity matrix of size N. Equation (22) can be rewritten as $$T(k+1) = E(T,v,k)T(k) + R(T,v,k)\hat{P}(s,v,k). \quad (25)$$

Equations (17) to (21) can be discretized for voltage-speed control in the $k^{th}$ scheduling interval as follows:

$$\max_{s(k)} \ PPW(s(k)) = \frac{\sum_{c=0}^{n} w_c s_c(k)}{P^T(s,v,T,k)1_{N \times 1} + P_{fan}(s_{fan})} \quad (26)$$

$$\text{s.t.} \ T(k+1) = E(T,v,k)T(k) + R(T,v,k)\hat{P}(s,v,k) \quad (27)$$

$$T(k+1) \leq T^{max} \quad (28)$$

$$s_c(k) = k_c^s \frac{(v_c(k) - v_{th})^{1.2}}{v_c(k)\max(T_c(k))^{1.19}}, \ \forall c \quad (29)$$

$$0_{n \times 1} \leq v(k) \leq 1_{n \times 1}. \quad (30)$$

As used herein, $w_c$ is a weight of a task executed on a core c. Furthermore, the inequality of equation (20) has been modified to an equality in equation (29). By forcing processor voltage to its lower bound, in some cases, power consumption is lowered without sacrificing performance, thereby, increasing energy efficiency (PPW)). In addition, the use of the equality halves the number of variables required to be solved, thereby reducing the computational complexity.

The optimization problem of equation (26) may be solved at the start of every scheduling interval for processor voltage/speed. The following properties allow for a solution of the above optimization problem Theorem 1: $PPW(s) = \dfrac{\sum_{c=0}^{n} w_c s_c}{P^T(s,v,T)1_{N \times 1} + P_{fan}(s_{fan})}$ As noted, PPW is a quasi-concave function of core speeds s and fan speed $s_{fan}$, enabling a unique solution of core speeds that maximizes the PPW.

The core temperatures T and core voltages v are convex functions of core speeds s. These properties also allow the use of standard gradient search techniques or any one of several other appropriate processes, such as ellipsoid and interior-point methods, to find a solution for PPW.

Task-to-Core Allocation

Equations (17) to (21) demonstrate that task-to-core allocation (TCA) is a mixed-integer, non-linear optimization problem, in which the unknowns include the allocation matrix M (the matrix specifying which tasks are allocated to which cores of the processor) and the core speeds s. To determine the TCA for a given migration interval (time between task allocations), the fan speed is held constant. One way to perform task allocation is a "brute force" enumeration of all possible task-to-core assignments, whose number is $^qP_n = q(q-1)(q-2) \ldots (q-n+1)$. However, with simplifications, task-to-core allocation can be transformed into a more manageable linear assignment problem (LAP).

An LAP includes selecting elements from a given cost or benefit matrix having at most one element selected from each row and column, such that the sum of the selected elements is minimized or maximized. To formulate the TCA as an LAP, a benefit matrix is determined as $P = [P_{ij}]$, where $P_{ij}$ is the benefit realized when allocating (in other words, assigning) task i to core j. Then the TCA can be expressed as follows:

$$\max_M \ \sum_{i=1}^{n} \sum_{j=1}^{q} M_{ij} P_{ij} \quad (31)$$

$$\text{s.t.} \ \sum_{i=1}^{n} M_{ij} = 1, \ j \in \{1, \ldots, q\} \quad (32)$$

$$\sum_{j=1}^{q} M_{ij} = 1, \ i \in \{1, \ldots, n\} \quad (33)$$

$$M_{ij} \in \{0, 1\}, \ i \in \{1, \ldots, n\}, j \in \{1, \ldots, q\}. \quad (34)$$

The above is an LAP which can be solved in polynomial time $(0((nq)^3))$ using known methods.

Some simplifications that enable a TCA having a performance maximization objective to be formulated as an LAP may include: (1) the lateral resistances between a cores in the die and the TIM layers are ignored as large L2 caches between cores reduce the lateral heat dissipation; and (2) the die capacitances are neglected, as the migration interval is much larger than the die thermal time constant and this saturates the die capacitances.

As explained above, the PPW function represents the ratio of the processor's total throughput (performance) to energy used. Using the above assumptions, the PPW function may be modified to be the sum of PPWs of individual cores without significant loss in accuracy. Thus $P_{ij}$ is simply the PPW of core i executing task j, and is given by $$P_{ij} = \frac{w_j s_i}{P_{die,ij}^T 1_{n \times 1}}. \quad (35)$$

Figure 8:
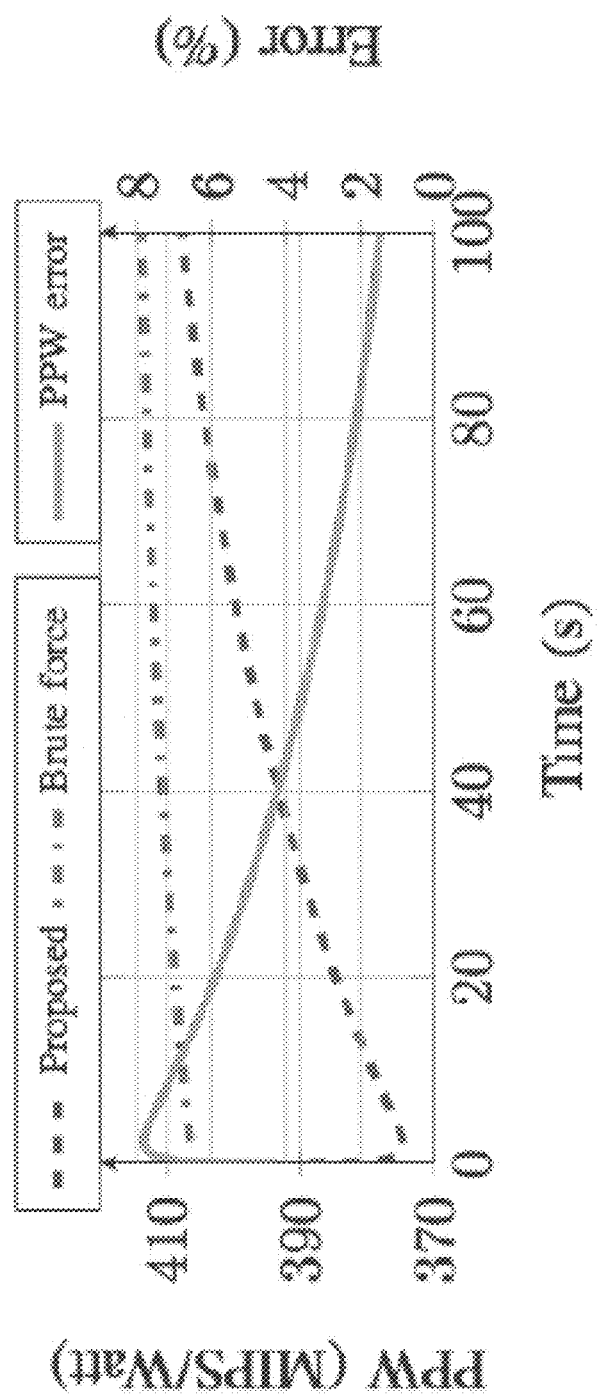
FIG. 8 is includes graphs comparing the PPW of an example brute-force task allocation with an alternative task allocation.

FIG. 8 shows an example comparison of PPW, when applying the above-described TCA technique using the LAP formulation (with the simplifying assumptions), with the brute-force TCA (obtained by enumerating all the possible assignments of 8 tasks on 4 cores, i.e., $^8P_4$=1680 assignments). The TCA was repeatedly solved every 100 ms, over a period of 100 s. The following observations are evident from the example plot.

The maximum error in PPW of the proposed TCA compared to the brute-force TCA is less than 8%. With time, the fluctuations in temperature decrease and evolve into steady state. Accordingly, the error also decreases with a decrease in temperature fluctuations and reaches a constant error. This constant error between the proposed TCA and the brute-force TCA is due to both methods maximizing different versions of the PPW objective (sum of individual PPWs versus global PPW).

The computation time of the brute-force TCA is much larger than the proposed TCA. IN this example, the brute force method required 304 s for determining allocation at every migration interval, whereas the proposed TCA required just 3.8 s, which results in an eighty-times speed increase. Note that the order of complexity of the brute-force TCA increases exponentially with the number of cores and tasks, while it is linear for the proposed TCA.

Fan Speed Control

As explained above, fan speed is changed over relatively longer time intervals, e.g., typically every few seconds (s). This is an order of magnitude less than the processor package thermal time constant (e.g., 20 s to 30 s). Once the optimal fan speed (that provides the best PPW) is determined at the beginning of a scheduling interval based on the current power dissipation and TCA, the fan speed is kept constant for the current interval. The problem of determining the optimal fan speed to improve (e.g., maximize) PPW, also requires the determination of optimal core speeds, which are determined as described above. Thus the required formulation for optimal fan speed scaling at the $k_{th}$ interval is given by $$\max_{s(k), s_{fan}} \frac{\sum_{c=0}^{n} w_c s_c(k)}{P^T(s, v, T, k)1_{N \times 1} + P_{fan}(s_{fan})} \quad (36)$$

$$\text{s.t. } T(s, s_{fan}, k+1) = E(s_{fan})T(k) + R(s_{fan})\hat{P}(s, v, k) \quad (37)$$

$$T(s, s_{fan}, k) \leq T^{max} \quad (38)$$

$$s_c(k) = k_c^s \frac{(v_c(k) - v_{th})^{1.2}}{v_c(k) \max(T_c(k))^{1.19}}, \forall c \quad (39)$$

$$0_{n \times 1} \leq v(k) \leq 1_{n \times 1}. \quad (40)$$

As was the case above, $w_c$ is the weight of the task assigned to core c. $R_{conv}$ is given by equation (10) above. E and R are defined in above equations (23) and (24), respectively. As described above, PPW is a quasi-concave function with respect core speeds. T is a convex function of the fan speed $s_{fan}$. Accordingly, the above formulation is also a quasi-concave function of $s_{fan}$. Hence, the solution techniques discussed above are also used to determine the optimal fan speed.

Figure 7:
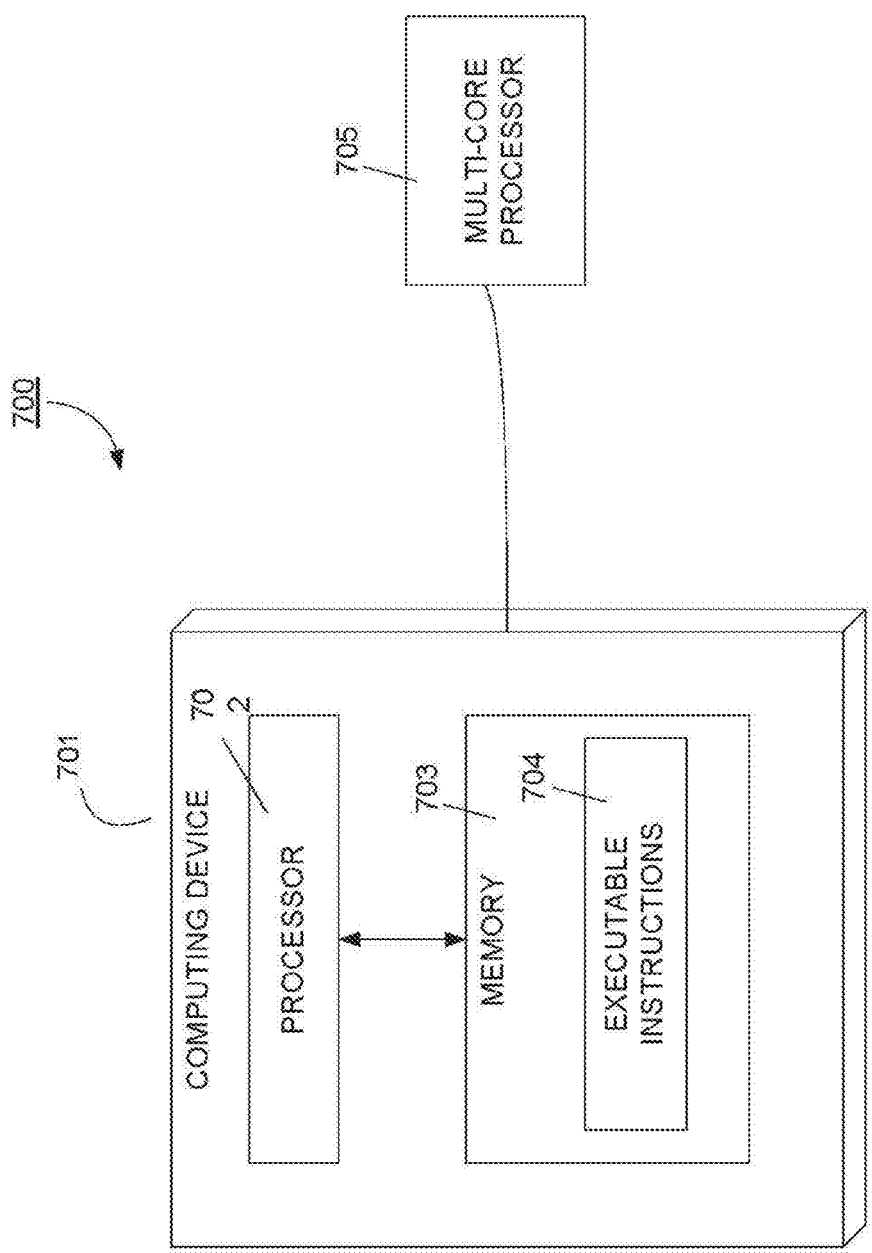
FIG. 7 is a block diagram showing an example system that may be used to perform the process of FIG. 6.

As explained above, the processes described herein may be performed using any computing device, such as a closed-loop controller, that is in communication with a processor whose PPW is to be determined. FIG. 7 shows an example configuration of a system 700 including a computing device 701 that interacts with multi-core processor 705 to implement a controller to determine parameters that result in a desired (e.g., optimized) PPW for multi-core processor. In this example implementation, computing device 701 includes its own processor and memory storing instructions that are executable to perform the processes described herein, including process 600. In some implementations, all or part of the functionality of computing device 701 may be implemented on one or more cores of multi-core processor 705.

All or part of the processes described herein and their various modifications (hereinafter referred to as "the processes") can be implemented, at least in part, via a computer program product, i.e., a computer program tangibly embodied in one or more non-transitory machine-readable storage media (e.g., hardware devices, such as a hard drive, computer memory, or the like), for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other implementations not specifically set forth above. Other implementations not specifically described herein are also within the scope of the following claims.

What is claimed is:

1. A method for controlling a processor using ones of parameters to achieve particular energy efficiency in the processor, comprising:
  obtaining parameters associated with operation of a processor, each of the parameters having a different time scale, wherein the parameters comprise a first parameter that is changeable on a first timescale, a second parameter that is changeable on a second timescale, and a third parameter that is changeable on a third timescale, the first timescale being greater than the second timescale, and the second timescale being greater than the third timescale;

performing an iterative process to identify ones of the parameters that achieve a particular energy efficiency in the processor, the energy efficiency of the processor corresponding to a quasi-concave function having a maximum that corresponds to the ones of the parameters, wherein the energy efficiency comprises performance-per-watt (PPW) for the processor, wherein the PPW for the processor is modeled by an objective function that relates PPW to processor speed, task migration, total power, and fan power consumption, the fan power consumption being a function of fan speed, and wherein the iterative process is performed to optimize the objective function to obtain a maximum PPW for the processor, the ones of the parameters being usable to obtain the maximum PPW during operation of the processor; and controlling the processor using the ones of the parameters corresponding to the maximum PPW to emphasize a type of operation of the processor.

2. The method of claim 1, wherein the first parameter comprises a fan speed corresponding to a speed of a fan used to cool the processor, the second parameter comprises task allocation corresponding to an allocation of tasks to a core of the processor, and the third parameter comprises a combination of voltage and processor speed, the voltage corresponding to a voltage applied to the core of the processor and the speed corresponding to a frequency of the core of the processor.

3. The method of claim 2, wherein the iterative process comprises:
determining energy efficiency values for the processor for different values of at least one of voltage or processor speed while the fan speed and task allocation are constant.

4. The method of claim 2, wherein the iterative process comprises:
determining energy efficiency values for the processor for different task allocations while, for each of the different task allocations, the fan speed is constant and at least one of voltage or processor speed varies.

5. The method of claim 2, wherein the iterative process comprises:
determining energy efficiency values for different fan speeds while, for each of the different fan speeds, both the task allocation and at least one of voltage or processor speed varies.

6. The method of claim 2, wherein the iterative process comprises:
determining energy efficiency values for the processor for different values of at least one of voltage or processor speed while task allocation and fan speed are held constant;
determining energy efficiency values for the processor for different task allocations while fan speed is held constant; and
determining energy efficiency values for the processor for different fan speeds.

7. The method of claim 1, wherein the processor is a multi-core processor and at least some of the parameters are for different cores of the multi-core processor.

8. One or more non-transitory machine-readable storage media storing instructions that are executable by one or more processing devices to perform operations comprising:

obtaining parameters associated with operation of a processor, each of the parameters having a different time scale, wherein the parameters comprise a first parameter that is changeable on a first timescale, a second parameter that is changeable on a second timescale, and a third parameter that is changeable on a third timescale, the first timescale being greater than the second timescale, and the second timescale being greater than the third timescale;

performing an iterative process to identify ones of the parameters that achieve a particular energy efficiency in the processor, the energy efficiency of the processor corresponding to a quasi-concave function having a maximum that corresponds to the ones of the parameters, wherein the energy efficiency comprises performance-per-watt (PPW) for the processor, wherein the PPW for the processor is modeled by an objective function that relates PPW to processor speed, task migration, total power, and fan power consumption, the fan power consumption being a function of fan speed, and wherein the iterative process is performed to optimize the objective function to obtain a maximum PPW for the processor, the ones of the parameters being usable to obtain the maximum PPW during operation of the processor; and controlling the processor using the ones of the parameters corresponding to the maximum PPW to emphasize a type of operation of the processor.

9. The one or more non-transitory machine-readable storage media of claim 8, wherein the first parameter comprises a fan speed corresponding to a speed of a fan used to cool the processor, the second parameter comprises task allocation corresponding to an allocation of tasks to a core of the processor, and the third parameter comprises a combination of voltage and processor speed, the voltage corresponding to a voltage applied to the core of the processor and the speed corresponding to a frequency of the core of the processor.

10. The one or more non-transitory machine-readable storage media of claim 9, wherein the iterative process comprises:
determining energy efficiency values for the processor for different values of at least one of voltage or processor speed while the fan speed and task allocation are constant.

11. The one or more non-transitory machine-readable storage media of claim 9, wherein the iterative process comprises:
determining energy efficiency values for the processor for different task allocations while, for each of the different task allocations, the fan speed is constant and at least one of voltage or processor speed varies.

12. The one or more non-transitory machine-readable storage media of claim 9, wherein the iterative process comprises:
determining energy efficiency values for different fan speeds while, for each of the different fan speeds, both the task allocation and at least one of voltage or processor speed varies.

13. The one or more non-transitory machine-readable storage media of claim 9, wherein the iterative process comprises:
determining energy efficiency values for the processor for different values of at least one of voltage or processor speed while task allocation and fan speed are held constant;

determining energy efficiency values for the processor for different task allocations while fan speed is held constant; and determining energy efficiency values for the processor for different fan speeds.

14. The one or more non-transitory machine-readable storage media of claim 8, wherein the processor is a multi-core processor and at least some of the parameters are for different cores of the multi-core processor.

15. A control system for controlling a processor using ones of parameters to achieve particular energy efficiency in the processor, comprising:

memory storing instructions that are executable; and one or more processing devices to execute the instructions to perform operations comprising:

obtaining parameters associated with operation of a processor, each of the parameters having a different time scale, wherein the parameters comprise a first parameter that is changeable on a first timescale, a second parameter that is changeable on a second timescale, and a third parameter that is changeable on a third timescale, the first timescale being greater than the second timescale, and the second timescale being greater than the third timescale;

performing an iterative process to identify ones of the parameters that achieve a particular energy efficiency in the processor, the energy efficiency of the processor corresponding to a quasi-concave function having a maximum that corresponds to the ones of the parameters, wherein the energy efficiency comprises performance-per-watt (PPW) for the processor, wherein the PPW for the processor is modeled by an objective function that relates PPW to processor speed, task migration, total power, and fan power consumption, the fan power consumption being a function of fan speed, and wherein the iterative process is performed to optimize the objective function to obtain a maximum PPW for the processor, the ones of the parameters being usable to obtain the maximum PPW during operation of the processor; and controlling the processor using the ones of the parameters corresponding to the maximum PPW to emphasize a type of operation of the processor.

16. The method of claim 1, wherein the different time scales correspond to different minimum time intervals within which the parameters are able to be changed.

* * * * *